United States Patent [19]

David et al.

[11] Patent Number: 4,459,579
[45] Date of Patent: Jul. 10, 1984

[54] PROCESS AND DEVICE FOR DETECTING THE UNDER-INFLATION OF A TIRE OF THE LANDING GEAR OF AN AIRCRAFT

[75] Inventors: Robert David, Tournefeuille; Louis Signorelli, Toulouse; Alain Geoffroy, Tournefeuille, all of France

[73] Assignee: Societe Nationale Industrielle et Aerospatiale, France

[21] Appl. No.: 322,846

[22] Filed: Nov. 19, 1981

[30] Foreign Application Priority Data

Nov. 27, 1980 [FR] France ................................ 80 25169

[51] Int. Cl.³ .............................................. G08G 1/12
[52] U.S. Cl. ..................................... 340/58; 73/146.2; 200/61.22; 340/529; 340/960
[58] Field of Search ...................... 340/58, 52 R, 27 R, 340/529; 200/61.22; 73/65, 146, 146.2, 178 T; 116/34 R; 280/1.12, 112 A, DIG. 1; 244/100 R, 102 A, 103 R, 104 R, 111

[56] References Cited

U.S. PATENT DOCUMENTS

| | | | |
|---|---|---|---|
| 3,234,534 | 2/1966 | Todman | 340/529 |
| 3,625,053 | 12/1971 | Laimins | 73/65 |
| 3,900,828 | 8/1975 | Loge et al. | 340/58 |

Primary Examiner—Glen R. Swann, III
Attorney, Agent, or Firm—Merriam, Marshall & Bicknell

[57] ABSTRACT

Process for detecting the under-inflation of a tire of the landing gear of an aircraft in the course of taxiing, said landing gear being formed by at least one bogie comprising a beam provided with a pair of twin wheels at each of its ends provision is made of two bridge assemblies of four strain gauges disposed on each of the parts of the beam located between the median spindle for articulation of said beam to the leg and the corresponding pair of wheels, each bridge being supplied by its diagonal transverse to said beam, while the torsion signal is taken from the diagonal longitudinal with respect to the beam.

11 Claims, 9 Drawing Figures

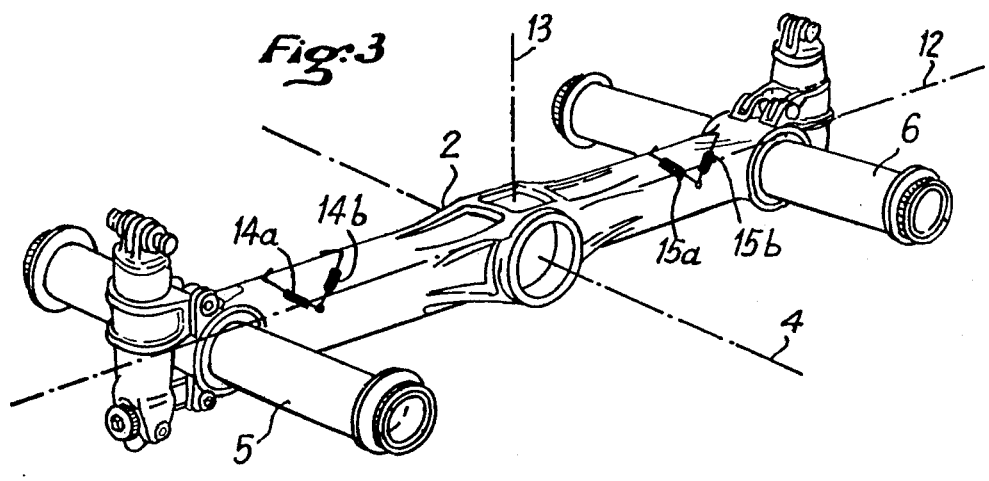
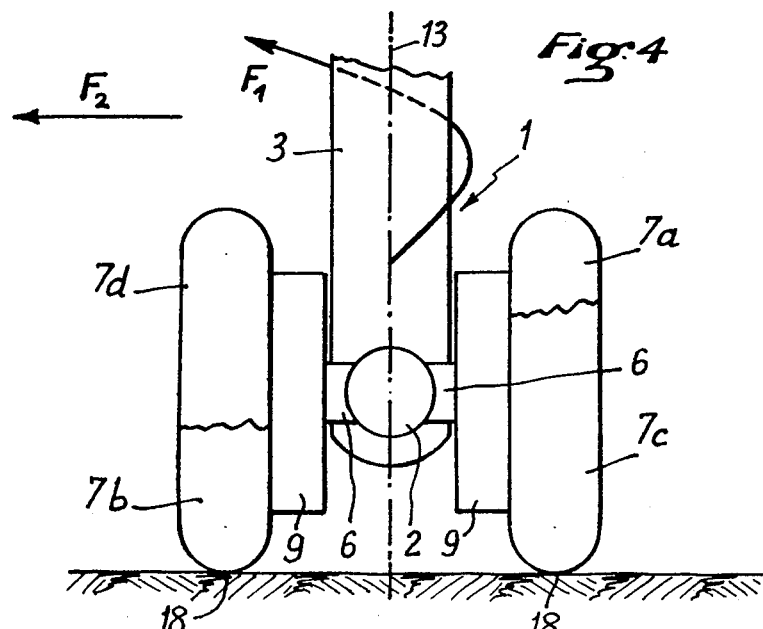
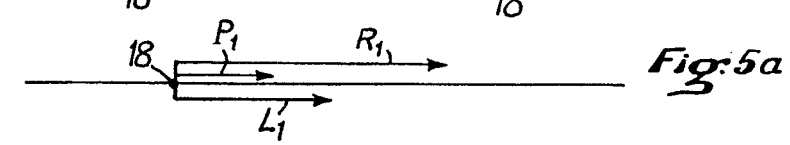
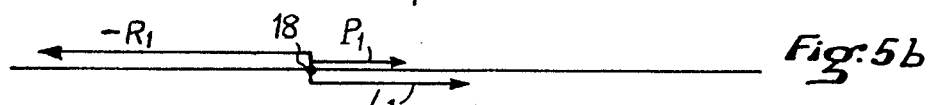
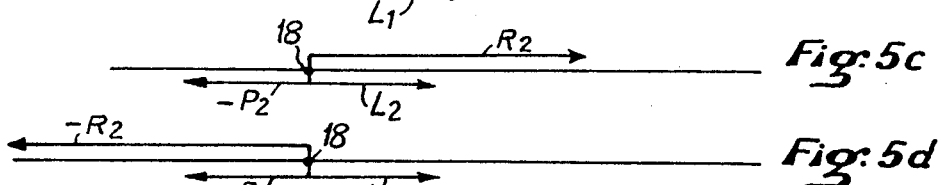
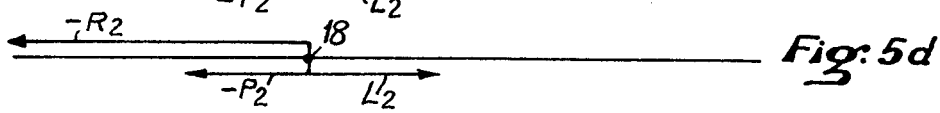

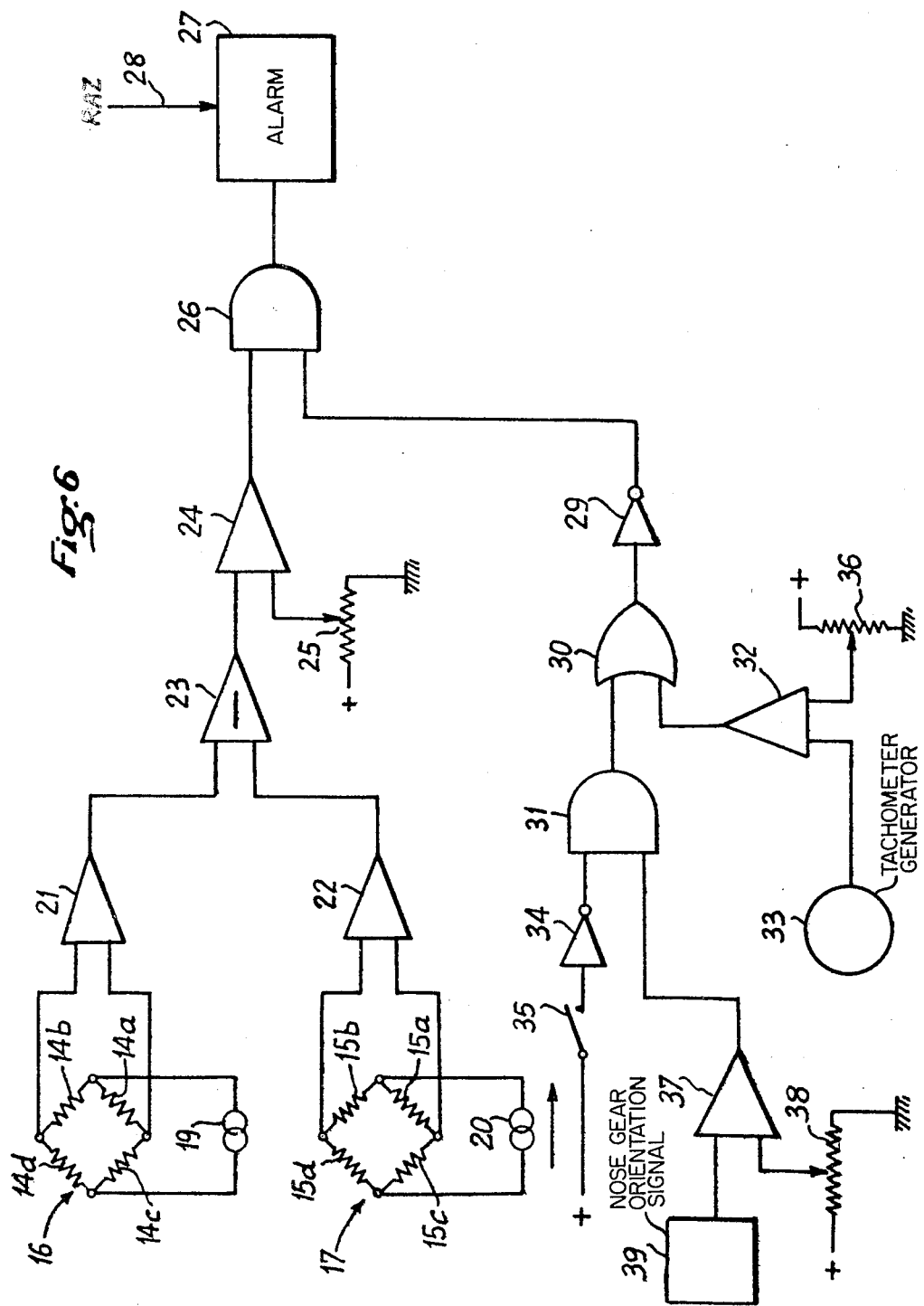

PROCESS AND DEVICE FOR DETECTING THE UNDER-INFLATION OF A TIRE OF THE LANDING GEAR OF AN AIRCRAFT

BACKGROUND OF THE INVENTION

The present invention relates to a process and a device for detecting the under-inflation of a tire of the landing gear of an aircraft. It is more particularly applicable to landing gears constituted by a least one bogie comprising a beam provided with a pair of twin tires at each of its ends and articulated about a median transverse spindle on a leg connecting said beam to the structure of the aircraft, the two wheels of each pair being disposed on either side of said beam.

A landing gear tire which is not sufficiently inflated may be destroyed rapidly when the aircraft is taxiing. Moreover, when the landing gear comprises pairs of twin wheels and the tire of one of the wheels of one pair is not sufficiently inflated, the tire of the other wheel of the pair is overloaded, which may also cause its destruction, for example upon takeoff or landing.

When an aircraft tire is destroyed during taxiing, parts of its outer cover are projected in the plane of its rim and may seriously damage the structure of the aircraft, as well as the systems adjacent thereto. In addition, taxiing on the rim risks destroying said rim, which may provoke difficulties in braking and accidents for the aircraft.

Devices are already known for detecting the under-inflation of a tire. For example, French Pat. Nos. 1 527 533, 2 076 108, 2 200 126 and 2 280 070, and U.S. Pat. No. 3,584,503 disclose disposing strain gauges on the axles of the wheels. This results in special complicated devices inside the hollow axles of the wheels. In this way, not only the arrangement of the strain gauges is complex and not easily accessible, but special devices are furthermore required, which have to be housed in the axles of the wheels.

The present invention makes it possible to use strain gauges which are easily available on the market.

SUMMARY OF THE INVENTION

To this end, according to the invention, the process for detecting the under-inflation of a tire of the landing gear of an aircraft in the course of taxiing, said landing gear being formed by at least one bogie comprising a beam provided with a pair of twin wheels at each of its ends and articulated about a median transverse spindle on a leg connecting said beam to the structure of the aircraft, the two wheels of each pair being disposed on either side of said beam, and said process employing strain gauges and an alarm device actuated by the latter when they detect the deflation of at least one tire, is noteworthy in that an arrangement of strain gauges is disposed on each of the parts of the beam located between said median spindle for articulation to the leg and the corresponding pair of wheels, said strain gauge arrangement being adapted to deliver a signal indicating the torsion of said beam part about its longitudinal axis and in that, each of said strain gauge arrangements being made in known manner in the form of a bridge assembly of four gauges, each bridge is disposed so that its four strain gauges are symmetrical in two's with respect to the plane passing through the axis of the leg and through the longitudinal axis of the beam, each bridge being supplied by its diagonal transverse to the beam, whilst the torsion signal is taken from the diagonal of the bridge longitudinal with respect to the beam.

In the present invention, the fact that the transverse articulation of the beam on the leg is longitudinally rigid is therefore advantageously used to prevent any rotation of the longitudinal axis of the said beam. This results in a particularly advantageous arrangement of the strain gauges, since they are simply fixed on the outer surface of the beam. Moreover, each of the strain gauges is usually available on the market.

European Patent Application No. 26 446 provides devices for detecting strain on the beam, but these devices are constituted by variable reluctance transducers, of complex structure.

The present invention therefore considerably simplifies the arrangement, installation and maintenance of the detectors for detecting under-inflation of aircraft landing gear tires.

Another feature of the invention advantageously resides in that the difference is effected between the signals coming from the two strain gauge arrangements associated with the beam and in that the difference thus obtained is compared with a reference value to actuate the alarm device when the said difference is greater than said reference value.

Moreover, due to the invention, the parasitic signals produced by the longitudinal bending strains and shearing strains are eliminated.

In order to obtain the greatest possible sensitivity, each strain gauge arrangement is advantageously arranged as close as possible to the pair of corresponding wheels. The strain gauge arrangements are advantageously arranged symmetrically to each other with respect to a plane passing through the axis of the leg and the median pivot axis.

In order not to take into account the effects on the tires due to the turning of the aircraft during taxiing, said alarm device is inhibited as soon as the orientation of the nose gear of the aircraft, which is steerable to turn said aircraft, exceeds a determined threshold, for example chosen at 3° with respect to the longitudinal axis of the aircraft. However, when the orientation of the nose gear of the aircraft is greater than said threshold, this inhibition is advantageously subjected to the condition that the power control of the engines of the aircraft is not in position of maximum power.

Furthermore, when the aircraft is taxiing slowly, the under-inflation of a tire does not present any particular danger. Thus, the alarm device may be inhibited when the taxiing speed of the aircraft is less than a determined threshold.

BRIEF DESCRIPTION OF THE DRAWINGS

The invention will be more readily understood on reading the following description with reference to the accompanying drawings, in which:

FIG. 3 is a perspective view of a beam for the bogie of FIGS. 1 and 2, provided with the strain gauges.

FIG. 4 is a schematic view in rear elevation of the bogie of FIGS. 1 and 2.

FIGS. 5a through 5d illustrate efforts exerted on each of the tires of the said bogie, in a particular case.

FIG. 6 gives the block diagram of the device according to the invention.

DESCRIPTION OF THE PREFERRED EMBODIMENT

Figure 1:
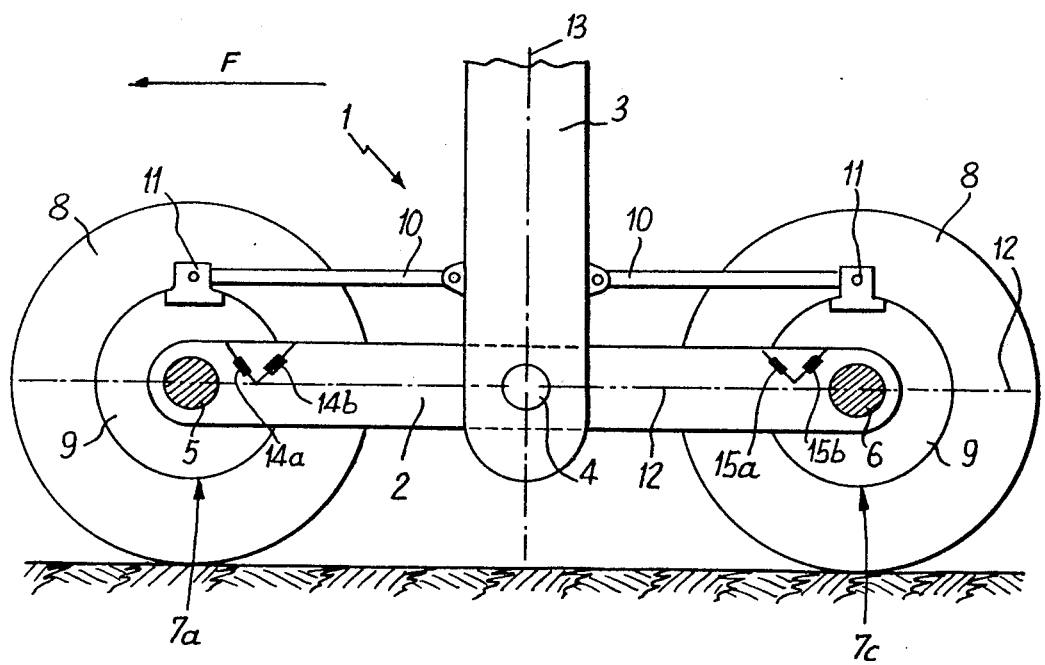
FIG. 1 is a schematic view in side elevation, along line of section I—I of FIG. 2, of a landing gear bogie to which the invention is applied.

Referring now to the drawings, the bogie 1 of a jumbo jet landing gear, shown in FIGS. 1 to 4, comprises a beam 2 articulated at its center on the lower part of a leg 3, via a horizontal spindle 4. The upper part of the leg 3 is fast with the fuselage (not shown) of the aircraft.

At its two ends, the beam 2 is provided with transverse shafts 5 or 6 on each of which are mounted two twin wheels 7a,7b or 7c,7d provided with tires 8. With each wheel 7a to 7d is associated a disc brake unit 9 of which the torque plate is prevented from rotating by a brake bar 10. To this end, each brake bar 10 is pivoted at one of its ends on the leg 3 and at its other end on a fork joint 11, fast with said corresponding torque plate.

Figure 2:
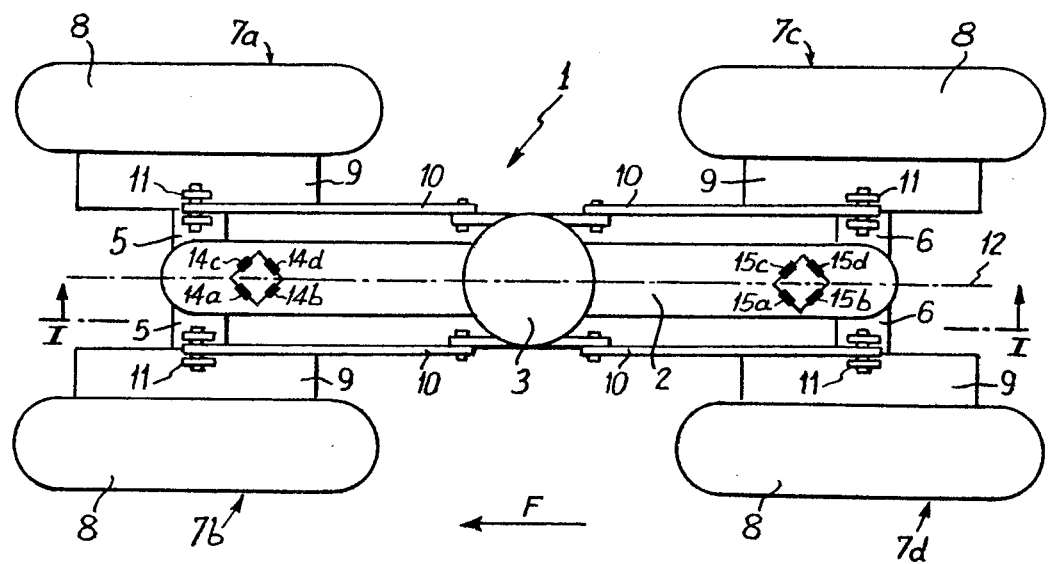
FIG. 2 is a schematic plan view of the bogie of FIG. 1.

The beam presents a longitudinal axis 12, generally coplanar, but at right angles to axes 4,5 and 6, whilst the leg 3 comprises a vertical axis 13. orque plate is As shown in FIGS. 1 to 3, a bridge of strain gauges (extensometric transducers) is mounted at each of the front and rear ends of the beam 2, in the vicinity of shafts 5 and 6. The front bridge comprises four gauges 14a to 14d, whilst the rear bridge comprises four gauges 15a to 15d.

The gauges 14a to 14d and 15a to 15d are in close mechanical contact with the beam 2, for example with the upper surface thereof, and are disposed so that the gauges 14a and 14b and 15a and 15b are respectively symmetrical to gauges 14c and 14d and 15c and 15d with respect to the plane defined by axes 12 and 13. Moreover, said gauges form an angle of about 45° with respect to axis 12. The signals produced by the longitudinal bending strains and the shearing strains are thus eliminated.

Furthermore, the bridges 14a to 14d and 15a to 15d are symmetrical to each other with respect to the plane passing through axes 4 and 13, when the beam 2 is horizontal.

FIG. 6 shows that the four strain gauges 14a to 14d are mounted to form a bridge 16, supplied by the diagonal passing through the points common to the gauges 14a and 14b on the one hand, and to gauges 14c and 14d on the other hand, the signal being taken at the terminals of the diagonal passing through the points common to the gauges 14a and 14c on the one hand, and gauges 14b and 14d on the other hand. Similarly, the four strain gauges 15a to 15d are mounted to form a bridge 17, supplied by the diagonal passing through the points common to the gauges 15a and 15b on the one hand and gauges 15c and 15d on the other hand, the signal being taken at the terminals of the diagonal passing through the points common to gauges 15a and 15c on the one hand and gauges 15b and 15d on the other hand.

When the tire 8 of one of the wheels 7a to 7d of the bogie 1 is under-inflated with respect to the tires of the other wheels, this results in a torsional strain (about axis 12) of the front or rear part of the beam 2 to which the wheel of the under-inflated tire belongs; in fact, the beam 2 is maintained fixed in longitudinal rotation, at the level of spindle 4. The resulting torsion of the relevent beam part is then measured by the corresponding gauge bridge 16 or 17.

Tests made by Applicants show that the level of the signal at the output of the bridges 16 or 17, when the aircraft has stopped, is an increasing function of the under-inflation of a tire 8 and, simultaneously, of the mass of the aircraft. When the aircraft is taxiing, the level of said torsion signal becomes, moreover, an inverse function of the taxiing speed.

However, the signals at the output of the bridges 16 and 17 take into account not only the under-inflation of a tire 8, but also, when the aircraft is taxiing, parasitic forces, such as:

lateral forces exerted on the aircraft, for example by a cross wind or skidding;

forces due to defects in perpendicularity between a landing gear and the landing strip, for example if the runway is bumpy;

forces due to the aircraft turning, since the wheels of the landing gears 1 are not steerable.

Thus, in order to be able to detect an under-inflation which is as weak as possible and to trigger off an alarm indicating significant under inflation, it is indispensable to eliminate these parasitic torsion signals.

FIGS. 5a to 5d show the lateral forces $L_1$ and $L_2$, the forces $P_1$ and $P_2$ due to defects in perpendicularity between the landing gear and the runway and forces $R_1$ and $R_2$ due to the aircraft turning whilst taxiing, at the point of contact 18 of the wheels with the ground, assuming that the aircraft was turning in direction of arrow $F_1$ and that it was subjected to the action of wind or skid in the direction of arrow $F_2$ (cf. FIG. 4).

If the bogie 1 located to the left of the aircraft is considered, its front wheels 7a and 7b (cf. FIG. 5a) are subject to forces $L_1+P_1+R_1$, whilst its rear wheels 7c and 7d (cf. FIG. 5b) are subject to forces $L_1+P_1-R_1$.

Under these conditions, for the bogie 1 located on the right of the aircraft, the front wheels 7a and 7b (cf. FIG. 5c) are subject to forces $L_2-P_2+R_2$ and the rear wheels 7c and 7d (cf. FIG. 5d) are subject to forces $L_2-P_2-R_2$.

The torsions corresponding to forces $L_1$ and $L_2$ are of the same sign and may be positive or negative. Moreover, experience shows that $L_1$ and $L_2$ are substantially equal, and that the same applies to $P_1$ and $P_2$. Consequently, if $L=L_1=L_2$ and $P=P_1=P_2$, the following Table may be drawn up:

|  | Forces on front wheels (1) | Forces on front wheels (2) | (1) + (2) | (1) − (2) |
|---|---|---|---|---|
| Left-hand bogie | $L + P + R_1$ | $L + P - R_1$ | $2L + 2P$ | $2R_1$ |
| Right-hand bogie | $L - P + R_2$ | $L - P - R_2$ | $2L - 2P$ | $2R_2$ |
| Difference between left-hand and right-hand bogies |  |  | $4P$ | $2R_1 - 2R_2$ |

As the value of the parasitic signal furnished by the strain gauges 14a to 14d and 15a to 15d and due to the aircraft turning (forces $R_1$ and $R_2$) may be high during taxiing on the taxiways, it may appear advantageous to eliminate this parasitic signal by effecting the sum, per bogie, of the forces on the front and rear wheels, then by effecting the difference of these sums, since the remaining parasitic signal is then 4P. The value of the perpendicularity of the landing gears with the runway is fairly well defined and it would therefore be possible to minimise the corresponding parasitic effect by causing the maximum perpendicularity signal $P_M$ (i.e. for the maximum mass of the aircraft) to intervene and by subtracting $2P_M$ from the sum of the forces (1)+(2) on the left hand bogie and by adding $2P_M$ to the sum of the forces (1)+(2) on the right hand bogie. The detection threshold of the system would then be set at a value higher than 4 $(P_m-P_M)$, $P_m$ corresponding to a mean value of the signal P.

However, such a combination of signals would involve a fairly high detection threshold for a relatively uninteresting result. In fact, it is quite possible to detect an under-inflation before take-off in the course of taxiing in a straight line, for example in the course of alignment before take-off. Furthermore, an under-inflation is not dangerous in the course of movements of an aircraft at low speed.

This is why, according to the present invention, it is the difference (1)−(2) between the signals issuing from the front gauges and the signals issuing from the rear gauges which is effected for each beam. The parasitic signal remaining in this combination is respectively $2R_1$ or $2R_2$, insofar as the aircraft is turning. If it is taxiing in a straight line, $R_1=R_2=0$ and no parasitic signal exists, apart from the background noise common to all electronic assemblies.

The device according to the invention is therefore inhibited when the aircraft is turning and is considered that there is turning when the nose gear of the aircraft has pivoted through more than three degrees. This inhibition is eliminated if the control of the power of the engines is activated completely for maximum power.

The device according to the invention is also inhibited if the aircraft speed is less than 5 meter/second.

FIG. 6 shows an embodiment of the detection device according to the invention corresponding to one side of a main landing gear.

The gauge bridges 16 (placed on the front part of the beam 2) and 17 (placed on the rear part of the beam 2) are respectively supplied by two D.C. generators 19 and 20. The outputs of said bridges 16 and 17 are respectively connected to the inputs of two amplifiers 21 and 22 each comprising a delay circuit of 0.5 seconds intended for eliminating the parasitic signals due to the vibrations of the landing gear, to the irregularities of the runway, etc.

The outputs of the amplifiers 21 and 22 are connected to the two inputs of a subtractor amplifier 23 effecting the difference of the amplified signals issuing from the bridges 16 and 17. The output of the subtractor 23 is connected to a comparator amplifier 24 which delivers a signal to an input of a gate 26, of AND type, when the signal issuing from the subtractor 23 exceeds a threshold determined by the potentiometric circuit 25. This circuit is adapted to eliminate the background noise of the preceding elements and to determine a certain under-inflation detection threshold.

The output of the AND gate 26 is connected to a signalling or alarm element 27 comprising a circuit for maintaining the alarm after it has been triggered off. The alarm maintaining circuit may be returned to state of rest with the aid of a return-to-zero circuit 28 controlled manually. The signalling element 27 is preferably a lamp but may be replaced or completed by a bell, gong or any other alarm means. It is activated when a signal appears at the output of the AND gate 26.

An inhibition circuit is connected on the second input of the AND gate, said inhibition circuit comprising a logic inverter 29 whose output is connected to said second input of the gate 26 and whose input is connected to the output of a gate 30 of OR type with two inputs.

A first input of the gate 30 receives the signals issuing from a comparator amplifier 32. The latter delivers a signal when the voltage furnished by a tachometer generator 33 of the nose gear of the aircraft is less than a threshold determined by a potentiometric assembly 36, said threshold corresponding for example to a speed of the aircraft of 5 meters/second.

The signal issuing from the comparator 32 is then inverted by 29 and therefore inhibits the gate 26 when the speed of the aircraft is less than 5 m/s.

The second input of the OR gate 30 is connected to the output of an AND gate 31 comprising two inputs. A first input is connected to the output of a logic inverter 34 whose input is connected to a positive source via a switch 35 activated when the power control of the engines of the aircraft is placed in the position corresponding to maximum power of said engines.

In this case, the AND gate 31 is therefore inhibited and delivers a zero signal which furnishes a signal 1 at the input of the AND gate 26 (due to the inverter 29).

The second input of the AND gate 31 is connected to the output of a comparator amplifier 37 which delivers a signal when the voltage furnished by a circuit 39 for reproducing the orientation of the nose wheel of the aircraft is greater than a threshold determined by a potentiometric assembly 38 and corresponding to an angle of 3° with respect to the aligned position of the nose gear for taxiing in a straight line.

The comparator amplifier 37 therefore delivers a signal when said orientation is greater than an angle of 3° to the left or to the right, and if the contactor 35 is open, the AND gate 31 delivers a signal 1 which gives a zero signal at the input of the AND gate 26 (due to the inverter 29) which is inhibited.

The conditions of inhibition of the detection assembly according to the invention are thus complied with.

If no inhibition is produced, the assembly triggers off the alarm as soon as a difference appears between the signals furnished by the bridges 16 and 17, if this difference has a duration greater than 0.5 second and if it exceeds a threshold determined by 25 and corresponding for example to a difference in inflation between the two tires of a pair of twin wheels of 30%.

What is claimed is:

1. Process for detecting underinflation of a tire in the landing gear of an aircraft while taxiing, said landing gear including at least one bogie comprising a beam articulated about a transverse spindle on a leg connecting said beam to the structure of the aircraft, said spindle being located at a median point between the ends of said beam and defining in part two beam sections extending respectively from said spindle to opposite ends of the beam, and a pair of twin wheels attached to each end of said beam, the wheels of each pair being disposed on opposite sides of said beam, said process comprising:
disposing in association with each section of said beam between said spindle and the associated pair of wheels, one of a pair of torsion detecting means including a bridge assembly of strain gauges for producing a signal representing the torsion of the corresponding beam section about its longitudinal axis;

comparing the signals from each of said torsion detection means while said aircraft is taxiing and obtaining the difference between said signals; and actuating an alarm indicating underinflation of a tire when said difference exceeds a predetermined reference value.

2. A process according to claim 1 wherein each of said bridge assemblies comprises four strain gauges symmetrically arranged on the surface of said beam in pairs on opposite sides of a plane passing through the longitudinal axis of said leg and the longitudinal axis of said beam, said bridge being supplied at its diagonal which is transverse to said beam and said signal representing torsion being taken from the diagonal of the bridge which is longitudinal with respect to the beam.

3. A process according to claim 2 wherein each of said bridge assemblies is located on said beam as close as possible to its associated pair of wheels.

4. A process according to claim 2 wherein said bridge assemblies are symmetrically located on opposite sides of a plane passing through the longitudinal axes of said leg and said spindle.

5. A process according to claim 1 wherein said alarm is actuated only when said difference exceeds said reference value for a predetermined interval of time.

6. A process according to claim 1 wherein said alarm is inhibited when the rotational orientation of a nosewheel of the aircraft, which is rotatable to stear said aircraft, exceeds a predetermined threshold of rotation.

7. A process according to claim 6 wherein said alarm device is not inhibited by rotation of said nosewheel beyond said threshold if said aircraft is operating under maximum power.

8. A process according to claim 1, wherein said alarm is inhibited when the taxiing speed of the aircraft is less than a predetermined threshold value.

9. Apparatus for detecting underinflation of a tire in the landing gear of an aircraft while taxiing, said landing gear including at least one bogie comprising a beam articulated about a transverse spindle on a leg connecting said beam to the structure of the aircraft, said spindle being located at a median point between the ends of said beam, and a pair of twin wheels attached to each end of said beam, the wheels of each pair being disposed on opposite sides of said beam, said apparatus comprising:

a pair of torsion detecting means associated respectively with a section of the beam between said spindle and each of said pairs of wheels, said torsion detecting means including a bridge assembly of strain gauges for producing a signal representing the torsion of the associated beam section about its longitudinal axis;

means for comparing the signals from said torsion detecting means and obtaining the difference between said signals;

means for comparing said difference with a predetermined reference value;

an alarm; and means for actuating said alarm when said difference exceeds said reference value.

10. Apparatus according to claim 9 wherein each of said bridge assemblies comprises four strain gauges symmetrically arranged on the surface of said beam in pairs on opposite sides of a plane passing through the longitudinal axis of said leg and the longitudinal axis of said beam, said bridge being supplied at its diagonal which is transverse to said beam and said signal representing torsion being taken from the diagonal of the bridge which is longitudinal with respect to the beam.

11. Apparatus according to claim 10 further including means for inhibiting said alarm under one or more predetermined conditions relating to the taxiing speed of the aircraft, the rotational orientation of a steerable nose gear of said aircraft, and the power output of the engines thereof.

* * * * *